United States Patent [19]

Tsutsumi et al.

[11] Patent Number: 5,603,814
[45] Date of Patent: Feb. 18, 1997

[54] MAGNETO-OPTICAL DISK

[75] Inventors: Kazuhiko Tsutsumi; Motohisa Taguchi; Hiroshi Sugahara, all of Amagasaki, Japan

[73] Assignee: Mitsubishi Denki Kabushiki Kaisha, Tokyo, Japan

[21] Appl. No.: 149,531

[22] Filed: Nov. 9, 1993

Related U.S. Application Data

[62] Division of Ser. No. 095,342, Jul. 23, 1993, abandoned, which is a continuation of Ser. No. 905,237, Jun. 29, 1992, Pat. No. 5,283,133, which is a continuation of Ser. No. 734,115, Jul. 25, 1991, abandoned, which is a continuation of Ser. No. 350,691, May 9, 1989, abandoned.

[30] Foreign Application Priority Data

Jul. 27, 1988 [JP] Japan .................................. 63-188806

[51] Int. Cl.$^6$ ............................. G11B 5/66; C23C 14/00
[52] U.S. Cl. ............................. 204/192.22; 204/192.26; 204/192.2; 428/694 DF; 428/694 NF; 428/694 AM; 428/800; 428/64.3; 360/59; 360/114; 360/131; 360/135; 365/122; 369/13

[58] Field of Search ................. 428/694 DE, 694 NF, 428/64.3, 634 AM; 360/53, 114, 131, 135; 369/13; 365/122; 204/192.2, 192.22, 197.26

[56] References Cited

U.S. PATENT DOCUMENTS

| | | | |
|---|---|---|---|
| 5,055,353 | 10/1991 | Yamamoto | 428/336 |
| 5,283,133 | 2/1994 | Tsutsumi | 428/694 NF |

*Primary Examiner*—Leszek Kiliman
*Attorney, Agent, or Firm*—Oblon, Spivak, McClelland, Maier & Neustadt, P.C.

[57] ABSTRACT

A method of making a magneto-optical disk. A first AlGeN dielectric film is formed by reactive sputtering on a substrate. Two targets, one of aluminum and one of germanium, are used in the sputtering in a mixed atmosphere having at least nitrogen gas. Alternatively, a single target using an aluminum germanium alloy can be used. A magnetic film is formed on top of this dielectric film. A second dielectric film is then formed on top of the magnetic film. An adhesive film is formed on top of the second dielectric film and a second substrate adhered thereto.

2 Claims, 1 Drawing Sheet

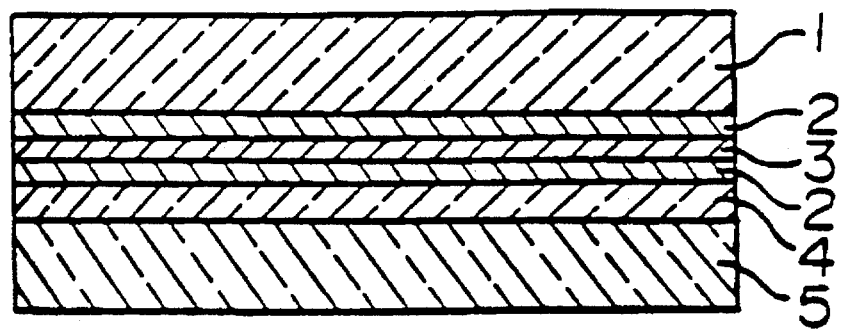

MAGNETO-OPTICAL DISK

This a division of application Ser. No. 08/095,342, filed on Jul. 23, 1993, now abandoned, which is a continuation of application Ser. No. 07/905,237, filed on Jun. 29, 1992, now U.S. Pat. No. 5,283,133, which is a continuation of application Ser. No. 07/734,115, filed on Jul. 25, 1991, now abandoned, which is a continuation of application Ser. No. 07/350,691, filed on May 9, 1989, now abandoned.

BACKGROUND OF THE INVENTION

FIELD OF THE INVENTION

The present invention concerns a magneto-optical disk for recording, reproducing and erasing information, for example, by laser beams.

DISCUSSION OF BACKGROUND

With the remarkable development of so-called information society in recent years, requirements for recording media of large capacity and relevant recording/reproducing system have been increased rapidly and laser video disks, digital audio-disks, write-once disks for use in image or document files have already been put to practical use. However, such recording media put to practical use at present have a drawback of being incapable of rewriting, and rewritable recording media and recording/reproducing system have been demanded. Then, as one of recording/reproducing systems, magneto-optical recording/reproducing systems have been proposed and shipping for their samples has already been started.

Magneto-optical disks used in the magneto-optical recording/reproducing system basically comprise a plastic substrate or a glass substrate on which an amorphous vertical magnetization membrane (or, a thin film of amorphous magnetic material having magnetic anisotropy so that the magnetic material is magnetized with its magnetic axis perpendicular to the plane of the thin film) is formed, and rare earth-transition metal alloys such as GdTbFe, TbFeCo, DyFeCo, GdDyFe, etc. are used as the magnetic material.

The written signal in a magneto-optical disk is read out by utilizing Kerr effect, that is, the rotation of the direction of polarization on reflection. The carrier-to-noise ratio (CNR) of read signal is generally insufficient for practical use because the Kerr rotational angle is small. In view of the above, it has been attempted to increase the Kerr rotational angle by forming a dielectric film of SiO or $SiO_2$ on the magnetic material.

However, since the rare earth-transition metal alloy film is not superior in anticorrosion property, it is required that the dielectric film is effective not only for increasing the Kerr rotational angle but also for protecting the corrosion of magnetic film. The SiO or $SiO_2$ film has a drawback of being incapable of providing substantial protection against corrosion. As for the improvement of the drawback, $Si_3N_4$ or AlN has been proposed as the dielectric film. As the example for the former, Japanese Patent Publication No. Sho 62-27458 discloses the use of a silicon nitride film, which increases the Kerr rotational angle and which is suitable to practical use.

When the silicon nitride film is deposited by means of sputtering, since the film having such a refractive index as that increases the Kerr rotational angle sufficiently involves large internal stresses therein, the film has often been peeled off after the preparation of the disk and thus lacks reliability. Furthermore, since the silicon nitride films deposited on the inner surface of the sputtering system peel off owing to the large internal stresses, there is a problem that dusts increase in the sputtering system and result in high defect density of the disk.

SUMMARY OF THE INVENTION

The present invention has been achieved in order to overcome the foregoing problems and it is an object thereof to obtain a magneto-optical disk capable of increasing the Kerr rotational angle and yet having sufficient corrosion resistivity and reliability and also have additional performance of reduced density of defects and high performance since dusts during fabrication processes decrease even upon use of a sputtering method.

The foregoing object of the present invention can be achieved by a method of making a magneto-optical disk. A first AlGeN dielectric film is formed on a substrate by reactive sputtering. Two targets are used in the sputtering, one with an aluminum target and one with a germanium target in a mixed atmosphere having at least nitrogen gas. Alternatively, a single target of aluminum-germanium alloy can be used. The magnetic film is formed on top of the dielectric film. A second dielectric film is then formed on top of the magnetic film by the same process as the first dielectric film. An adhesive film is placed on the second dielectric film and the second substrate is adhered thereto.

BRIEF DESCRIPTION OF THE ACCOMPANYING DRAWINGS

These and other objects, as well as advantageous features of the present invention will become apparent by reading the following descriptions for one embodiment according to the present invention in conjunction with the accompanying drawings, wherein the drawing illustrates a cross sectional view for a magneto-optical disk in one embodiment according to the present invention.

DETAILED DESCRIPTION OF THE PREFERRED EMBODIMENTS

The drawing shows a cross sectional view for a magneto-optical disk of one embodiment according to the present invention, comprising a substrate 1, for example, made of glass or plastics, a dielectric film 2 made of aluminum germanium nitride (AlGeN), a magnetic film 3, for example, made of an amorphous TbFeCO alloy film, a bonding adhesive 4 and a bonding substrate 5.

The dielectric film 2 made of aluminum germanium nitride can be formed, for example, by reactive sputtering using a target of aluminum—germanium alloy in a mixed atmosphere of an inert gas and a nitrogen gas, or by reactive sputtering, for example, using two targets, i.e., of an aluminum target and a germanium target in a mixed atmosphere of an inert gas and a nitrogen gas.

The film thickness of AlGeN formed on the substrate is, preferably, selected within a range from 600 Å to 800 Å.

The present invention is to be described specifically by way of examples.

EXAMPLE 1

After evacuating a vacuum vessel to about $10^{-7}$ Torr, a mixed gas of Ar and $N_2$ was introduced to about $2 \times 10^{-3}$ Torr. DC sputtering was applied while using an aluminum alloy target (Ge: 50 at %), to form a dielectric film 2 made of aluminum germanium nitride (AlGeN) of about 650 Å film thickness on the substrate 1 made of polycarbonate. The resultant AlGeN film had physical property with the refractive index of about 2.5 at a wavelength of 830 nm.

The internal stress was $1\times10^9$ dyn/cm$^2$. The film forming rate was about 50 Å/min at the charging power of 300W.

Then, the magnetic film 3 made of TbFeCo was formed by means of sputtering to a thickness of about 1,000 Å by a conventional method. Then, the AlGeN film 2 with the film thickness of about 1,000 Å was formed further thereover in the same manner.

Finally, a polycarbonate substrate 5 was bonded by using the adhesive 4 to produce a magneto-optical disk as one example of the present invention.

The magneto-optical property of the resultant magneto-optical disk, upon irradiation of light with a wavelength of 830 nm from the side of the substrate, was: reflectance R=15% and Kerr rotational angel $\theta_K$=1.2 deg.

Further, the recording/reproducing characteristics of the magneto-optical disk of one example of the present invention was measured by using an optical head carrying a laser with a wavelength of 830 nm from the side of the substrate. When the recording frequency was 1 MHz and the rotation speed was 1,800 rpm, the carrier-to-noise ratio (hereinafter simply referred to as CNR) was 62 dB and the bit error rate (hereinafter simply referred to as BER) was $1.0\times10^{-6}$.

Further, when the magneto-optical disk of one example of the present invention was examined, after maintaining in an atmosphere at a temperature of 60° C. and at a relative humidity of 90% for about 300 hours, no abnormality such as film peeling was observed.

EXAMPLE 2

A magneto-optical disk of another example of the present invention was prepared in the same manner as in Example 1 except for conducting two-source sputtering while using, as the target, an aluminum target and a germanium target. The recording/reproducing characteristics of the resultant magneto-optical disk were 61.5 db of CNR and $1.2\times10^{-6}$ of BER.

When the same examination as that for Example 1 was conducted to the magneto-optical disk in another example of the present invention, similar effects to that in Example 1 could also be obtained.

COMPARATIVE EXAMPLE

A magneto-optical disk was prepared in the same manner as in Example 1 except for using an Al target as the target. The resultant AlN film had a refractive index of 1.9, reflectance R=30%, Kerr rotational angle $\theta_K$=0.6 deg and the recording/reproducing characteristics of: CNR=55 dB.

From the foregoing, it can be seen that the magneto-optical disks of the example of the present invention had increased Kerr rotational angle due to the increased refractive index and higher performance for CNR.

Further, although the explanation has been made in the example for the case where the substrate, AlGeN film, recording magnetic film and AlGeN film were successively laminated, other constitutions may also be employed, for example, comprising the substrate, AlGeN film, recording magnetic film and reflection film, or comprising the substrate, AlGeN film, recording magnetic film, AlGeN film and reflection film, etc., providing that the AlGeN film is disposed so that the Kerr rotation angle is increased.

As has been explained above, since a substrate, a dielectric film comprising aluminum germanium nitride disposed on the substrate and a magnetic film disposed on the dielectric film are used in the present invention, it is possible to obtain a magneto-optical disk with increased Kerr rotation angle while having sufficient corrosion resistivity and reliability. Further, since dust, etc. during fabrication process is reduced even using the sputtering method for the production, an additional effect capable of obtaining a magneto-optical disk of high performance with low defect density.

What is claimed is:

1. A method of making a magneto-optical disk comprising the steps of:

formation by reactive sputtering on a substrate a first AlGeN dielectric film by use of an aluminum-germanium alloy target in a mixed atmosphere wherein said mixed atmosphere comprises at least a nitrogen gas;

forming a magnetic film on top of said first formed AlGeN dielectric film;

forming a second dielectric film, by the same process as said first dielectric film on top of said magnetic film; and forming an adhesive film on said second dielectric film for adhering said second dielectric film to a second substrate.

2. A method of making a magneto-optical disk comprising the steps of:

formation by reactive sputtering on a substrate a first AlGeN dielectric film by use of two targets including an aluminum target and a germanium target in a mixed atmosphere wherein said mixed atmosphere comprises at least a nitrogen gas;

forming a magnetic film on top of said first formed AlGeN dielectric film;

forming a second dielectric film, by the same process as said first dielectric film on top of said magnetic film; and forming an adhesive film on said second dielectric film for adhering said second dielectric film to a second substrate.

* * * * *